June 1, 1971  R. E. PHELON  3,581,394
ROTOR ANNULUS FOR ELECTRIC GENERATOR
Filed May 13, 1969  2 Sheets-Sheet 1
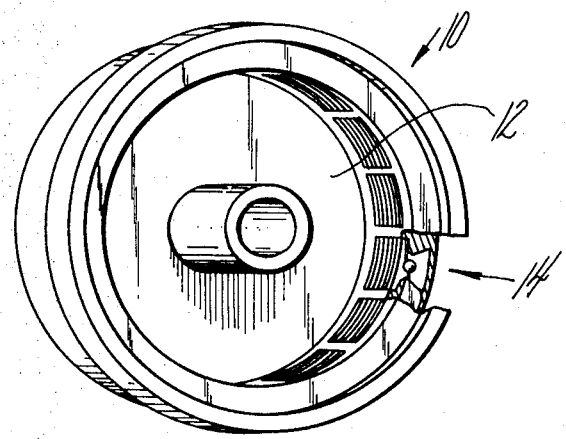
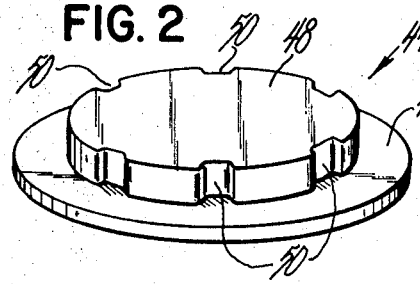
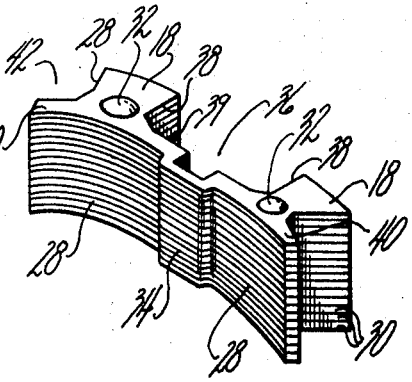
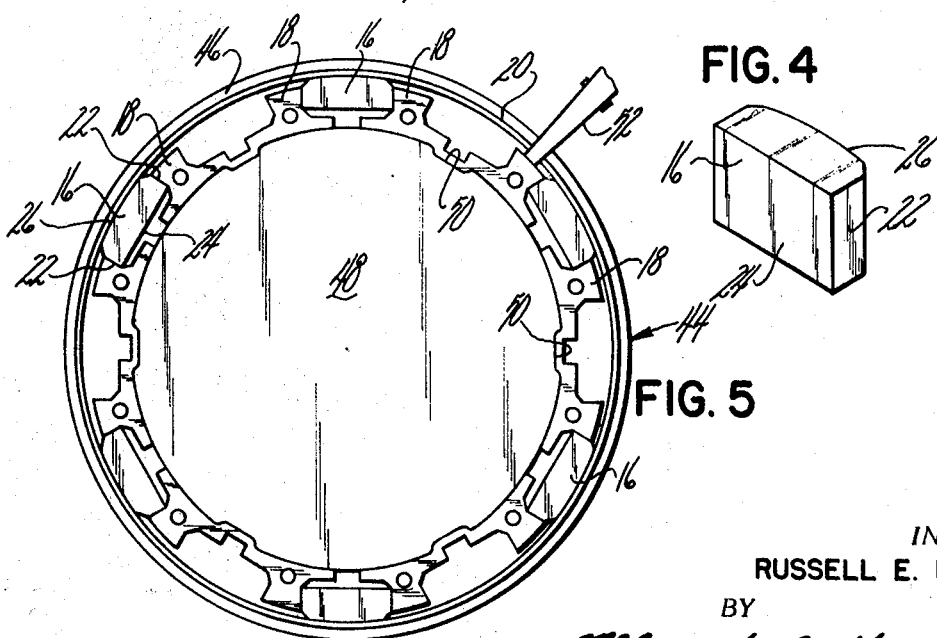
INVENTOR.
RUSSELL E. PHELON
BY
*McCormick, Paulding & Huber*
ATTORNEYS `United States Patent Office`

3,581,394
Patented June 1, 1971

3,581,394
ROTOR ANNULUS FOR ELECTRIC GENERATOR
Russell E. Phelon, Beverly Hills, Rio Piedras,
Puerto Rico 00928
Filed May 13, 1969, Ser. No. 824,138
Int. Cl. H02k 21/12
U.S. Cl. 310—156      4 Claims

ABSTRACT OF THE DISCLOSURE

A rotor annulus for an electric generator comprising an annular ring of magnetic members including permanent magnets and pole pieces arranged in respective end-to-end and circumaxial alternate series. A circular spring band surrounds the ring of members in pressing engagement with at least some of the members to hold all of the elements of the annulus in substantially fixed relationship with each other.

CROSS REFERENCE TO RELATED PATENT

A rotor annulus similar in some respects to the annulus hereinafter described is shown in my U.S. Pat. No. 3,132,270, issued May 5, 1964, and entitled "Rotor Annulus For Electric Generator."

BACKGROUND OF THE INVENTION

The invention relates generally to electric generators adapted for use with internal combustion engines and more particularly to a rotor for an electric generator of the flywheel type in which a plurality of permanent magnets and associated pole pieces are imbedded in the inner peripheral portions of the rim of the flywheel.

The manufacture of such rotors requires that individual magnets and pole pieces first be assembled to form an annulus having a large central opening. Subsequently, the annulus is inserted in a casting die having a die cavity conforming to the required shape of the rotor and nonmagnetic metal is cast around the major portion of the annulus to form the rotor flywheel.

Heretofore, and in accordance with my aforementioned U.S. patent, an annulus has been formed comprising an annular series of magnetic members including pole pieces and magnets surrounded by a circular band. One or more spacing members or shims each inserted between two of the magnetic members tend to enlarge the diameter of the annular series of magnetic members and thereby press some of the members radially outwardly against the circular band so as to hold all members of the annulus in substantially fixed relationship with each other. This method of manufacture is disadvantageous in that it requires positioning one or more spacers otherwise unessential in the assembly and may and probably does result in a slightly elliptical or otherwise out of round annulus which may require correction for any deviation from a true circular shape prior to the casting step.

Accordingly, the general aim of this invention is to provide an improved annulus of magnets and pole pieces for use in the manufacture of a rotor for an electric generator, such annulus being readily and easily formed into a self-sustaining unit prior to its placement in the die cavity without the expenditure of much time or labor in accurately positioning or securing the parts relative to each other.

SUMMARY OF THE INVENTION

In accordance with the present invention an annulus is made from a plurality of magnetic members which include magnets and pole pieces adapted for accurate positioning relative to each other to form an annular ring having a large central opening of circular shape, providing a circular band which in a preassembled condition has an inside diameter greater than the outside diameter of the ring, positioning the band to circumaxially surround the ring, and reducing the diameter of the ring to bring it into pressing engagement with at least some of the magnetic members to hold the various elements of the annulus in assembly.

BRIEF DESCRIPTION OF THE DRAWING

FIG. 1 is a perspective view of a cast rotor for an electric generator and having an annulus made in accordance with the present invention.

FIG. 2 is a perspective view of a fixture on which the annulus of FIG. 1 is assembled.

FIG. 3 is a perspective view of one of the laminated pole pieces included in the annulus of FIG. 1.

FIG. 4 is a perspective view of one of the magnets included in the annulus of FIG. 1.

FIG. 5 is a plan view of a partially assembled annulus and shows the annulus prior to deformation of its band and a tool positioned for deforming the band.

DETAILED DESCRIPTION OF PREFERRED EMBODIMENTS

An annulus made in accordance with the present invention has a large central opening and comprises an annular series of magnetic members which series includes an annular arrangement of permanent magnets and also includes an annular arrangement of pole pieces. The pole pieces respectively engage the magnets and have their inner faces at least approximately tangent to a central cylindrical surface which has a diameter approximately the same as that of said large central opening. The annulus also includes a circular band which surrounds said magnetic members and engages at least some of the members and to apply continuing radial pressure to the latter members to hold all of the elements of the annulus in substantially fixed relationship with each other. After the annulus has been formed, it is inserted in a casting die and a nonmagnetic material is cast about its major portion so as to form the body of a rotor structure such as indicated at 10 in FIG. 1 which has a large central opening 12.

Figure 6:
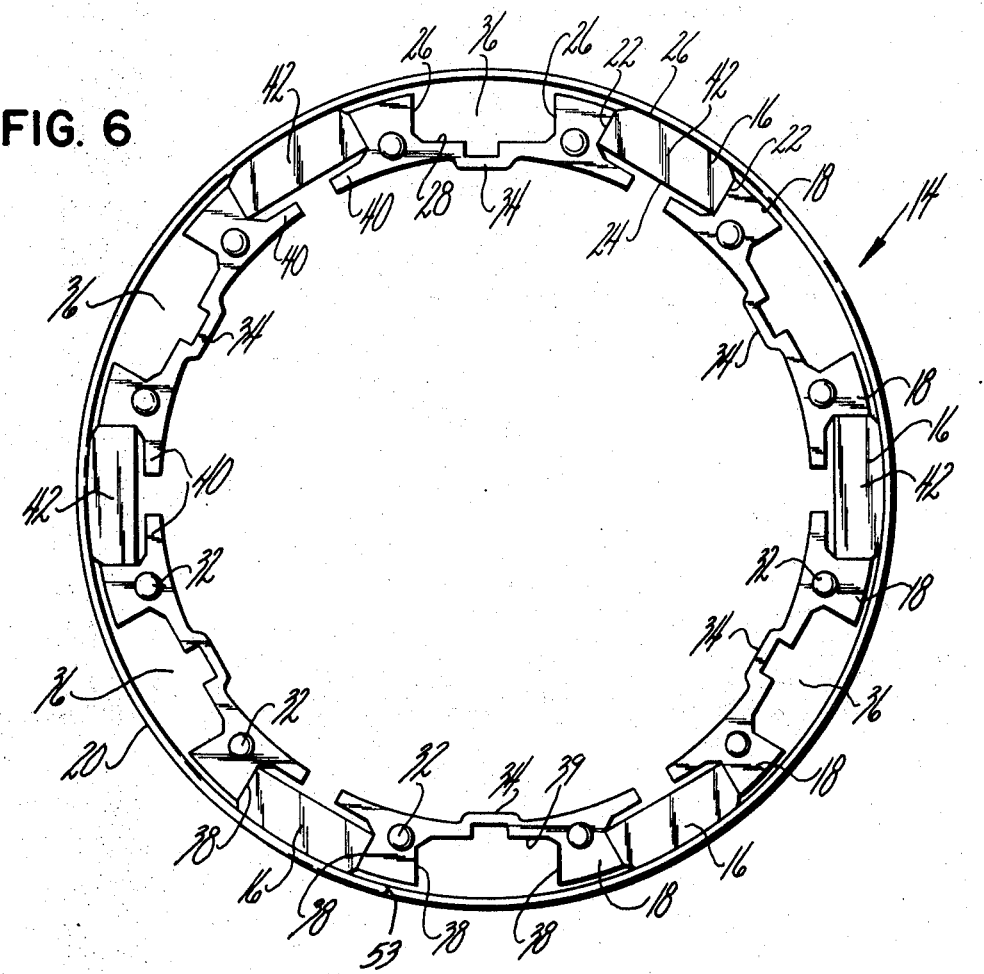
FIG. 6 is a plan view of an assembled annulus.
Figure 7:
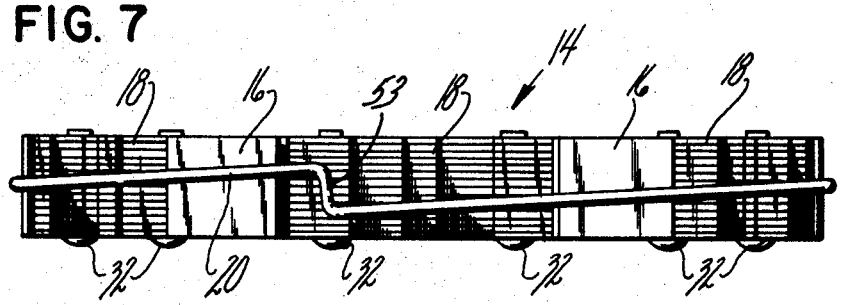
FIG. 7 is a side view of the annulus of FIG. 6.

One example of an annulus of permanent magnets and pole pieces constructed in accordance with the present invention is indicated generally at 14 in FIGS. 6 and 7. The annulus 14 comprises tangentially charged magnets 16, 16 with pole pieces 18, 18 associated therewith interposed between them. A resilient circular band 20 circumaxially surrounds the ring of members which comprises the magnets and pole pieces and holds them in assembled relation with each other in a manner hereinafter described. As shown, the several magnets and pole pieces of the annulus are alternately positioned with respect to each other but the invention in its broader aspects is not limited to the particular arrangement shown.

The permanent magnets 16, 16 which are utilized in the annulus 14 may be individually formed or may, if desired, be cast in a continuous strip provided with weakening grooves which permit the strip to be broken to obtain individual magnets. For a disclosure of this strip casting method of providing magnets, reference may be had to my aforementioned U.S. patent. Each magnet 16 has a generally rectangular shape and includes smooth opposite end surfaces 22, 22, a substantially flat inner surface 24 and a generally arcuately shaped outer surface 26 as best shown in FIG. 4. When the magnets 16, 16 are charged tangentially the pole pieces 18, 18 may advantageously be formed generally arcuate in shape with curved inner faces 28, 28 each having a radius of curvature substantially equal to that of the central opening 12. Each pole piece 18, 18 is a lamination of a plurality of thin metal plates 30, 30 secured together by rivets 32, 32 and best shown in FIG. 3.

Preferably and as shown, the pole pieces 18, 18 are formed in pairs, each pair being joined together by an integral connection portion 34 spaced radially inwardly of the pole faces 28, 28. The combined two-part pole pieces are sometimes hereinafter referred to as duplex pole pieces. When there are pairs of pole pieces, each pair has an intermediate magnet receiving recess 36, the inner side surfaces 38, 38 of which are shaped to compliment the smooth opposite side surfaces 22, 22 of the magnets 16, 16. The inner surface 39 of each recess 36 is cut away to provide a clearance space between the bottom surface 24 of an associated magnet 16 and the pole pieces 18 so that the surface 24 will not prevent proper location of the magnet 16 in the recessses. In a similar manner, end portions 40, 40 of the plates 30, 30 are shaped to define one-half of a recess 42 similar to the intermediate recess 36 so that the opposite end portions 40, 40 of adjacent pairs of pole pieces will cooperate to define magnet receiving recesses 42, 42 between adjacent pairs of pole pieces 18, 18.

In the particular annulus construction shown in the drawings, six magnets are utilized and are positioned in the recesses 42, 42 formed by the end portions 40, 40 of adjacent duplex pole pieces, magnets being omitted in the recesses 36, 36. It will be evident, however, that magnets may, if desired, be positioned in the latter recesses. The magnets 16, 16 and the pole pieces 18, 18 are thus arranged in an annular series and the several pole pieces and magnets are alternately positioned with respect to each other.

The band 20 in its preassembled condition has an inside diameter greater than the outside diameter of the ring of members and may be made from any suitable material, but preferably and as shown it is made from an endless piece of resilient wire. If steel wire is used to make the band rather than a more expensive non-magnetic material, it is preferable that wire of a relatively light gauge be used to minimize any tendency of the band to short circuit the magnets 16, 16. The ends of the bands may be secured together by any suitable fastening means and may, for example, be joined by spot welding.

The annulus 14 is preferably assembled on a fixture, such a fixture being indicated generally at 44 in FIG. 2. The fixture 44 has a base 46 and a generally cylindrical portion 47, the diameter of which is substantially equal to the diameter of the central opening 12. A circumaxially spaced series of recesses 50, 50 formed in the central portion 48 each respectively receive and complement an associated connecting portion 34 of a duplex pole piece. Thus, the recesses 50, 50 aid in locating or positioning the various magnet members have been positioned on the fixture 44 to form an annular ring of members, as aforedescribed, the band 20 is positioned to circumaxially surround the ring of members in the manner generally shown in FIG. 5. Thereafter, at least one portion of the band is deformed to reduce the diameter thereof and bring the band into pressing engagement with at least some of the magnetic members to hold all of the elements of the annulus in substantially fixed relationship with each other. In accordance with one presently preferred method of practicing the invention, a portion of the band 20 is deformed by applying a twisting force thereto as by grasping it between two jaws such as the jaws of the pliers 52 shown in FIG. 5 and rotating the jaws about an axis extending radially of the annulus 14. The band 20 in its deformed state has at least one indicated at 53 and best shown in FIG. 7.

The formation of the rotor 10 is completed by positioning the annulus 14 in the cavity of a casting die (not shown) and casting non-magnetic material such as aluminum around the major portion of the annulus 14. After the casting is removed from the die cavity and has cooled sufficiently, the inner surfaces 28, 28 of the pole pieces 18, 18 are machined so as to make them truly cylindrical. In the machining process, the connecting portions 34, 34 are machined away and the pole pieces 18, 18 of each duplex pole piece are thereby separated.

What is claimed is:

1. An annulus for the rotor of an electric generator, which annulus has a large central opening and comprises in combination: an annular series of magnetic members which series includes an annular arrangement of permanent magnets and also includes an annular arragement of pole pieces respectively egaging the magnets and located with their inner faces approximately tangent to a cylindrical surface having the diameter of said large central opening, a generally circular band surrounding said magnetic members, said band having at least one deformed portion offset in a non-circumferential direction effecting reduction of the diameter thereof and substantially uniformly spaced pressure engagement between said band and at least some of said members to hold all elements of the annulus in substantially fixed relationship with each other.

2. An annulus for the rotor of an electric generator as set forth in claim 1 wherein said band comprises a resilient endless piece of wire.

3. An annulus for the rotor of an electric generator as set forth in claim 1 wherein said one deformed portion is off-set in an axial direction.

4. An annulus for the rotor of an electric generator as set forth in claim 2 wherein said band is made of magnetic material.

References Cited

UNITED STATES PATENTS

| | | | |
|---|---|---|---|
| 450,552 | 4/1891 | Atwood | 310—271 |
| 2,475,776 | 7/1949 | Brainard | 310—156 |
| 2,516,901 | 8/1950 | Morrill | 310—156 |
| 2,756,356 | 7/1956 | Brownlee | 310—153 |
| 3,312,270 | 5/1964 | Phelon | 310—153 |

FOREIGN PATENTS

| | | | |
|---|---|---|---|
| 850,193 | 10/1960 | Great Britain | 310—153 |
| 761,181 | 12/1944 | Germany | 310—271 |

MILTON O. HIRSHFIELD, Primary Examiner

R. SKUDY, Assistant Examiner

U.S. CL. X.R.

310—271

PO-1050
(5/69)

UNITED STATES PATENT OFFICE
CERTIFICATE OF CORRECTION

Patent No. 3,581,394          Dated June 1, 1971

Inventor(s) Russell E. Phelon

It is certified that error appears in the above-identified patent and that said Letters Patent are hereby corrected as shown below:

Col. 3, line 49, "47" should read --48--.

Col. 3, line 54, following "positioning the" insert --pole pieces with respect to the fixture 44. When the--.

Col. 4, line 8, following "one" insert --non-circumferential or axially off-set portion such as--.

Col. 4, line 26, "egaging" should read --engaging--.

Signed and sealed this 21st day of September 1971.

(SEAL)
Attest:

EDWARD M. FLETCHER, JR.          ROBERT GOTTSCHALK
Attesting Officer          Acting Commissioner of Patents